United States Patent [19]

Takeda et al.

[11] Patent Number: 4,467,252

[45] Date of Patent: Aug. 21, 1984

[54] AUTOMATIC SEAT POSITIONING DEVICE FOR A VEHICLE DRIVER SEAT

[75] Inventors: Hitoshi Takeda, Yokohama; Hidetaka Suzuki, Yokosuka; Ken Kamijo, Zushi; Hideyuki Nagashima, Yokohama, all of Japan

[73] Assignee: Nissan Motor Company, Limited, Yokohama, Japan

[21] Appl. No.: 449,737

[22] Filed: Dec. 14, 1982

[30] Foreign Application Priority Data

Dec. 17, 1981 [JP] Japan .......................... 56-202559

[51] Int. Cl.³ .............................................. G05B 19/28
[52] U.S. Cl. .................................. 318/603; 318/568; 297/330
[58] Field of Search ............... 318/603, 568, 9, 10, 318/14; 297/330

[56] References Cited

U.S. PATENT DOCUMENTS

| | | | |
|---|---|---|---|
| 3,042,170 | 7/1962 | Tschirf et al. ................ | 318/568 X |
| 4,128,797 | 12/1978 | Murata et al. ................ | 318/568 X |
| 4,250,439 | 2/1981 | Hohmann ...................... | 318/568 X |
| 4,264,849 | 4/1981 | Fleischer et al. ............. | 318/568 |

*Primary Examiner*—B. Dobeck
*Attorney, Agent, or Firm*—Schwartz, Jeffery, Schwaab, Mack, Blumenthal & Koch

[57] ABSTRACT

An automatic seat positioning device for a vehicle driver's seat wherein a reversible motor is engaged with one of electromagnetic clutches and rotates so that an associated seat member actuating mechanism moves one of the seat members to a desired position for a specific driver from an initial position upto a maximum movable end. In such an automatic seat positioning device of the construction described above, a seat position detector corresponding to the seat member for detecting that the seat member arrives at a specific position at which the detector is located and a preset control circuit for presetting a counter, which indicates the set position of the seat member by counting the number of rotations of the motor, to a value corresponding to the number of rotations of the motor by which the seat member is moved from an initial starting position to the specific position are provided so that an indication error of the counter can be canceled due to slips which occur whenever the motor is repetitively started and stopped, engaged with the electromagnetic clutch. In addition, the automatic seat positioning device stores the positional data of the seat member set at the desired position from the counted value of the counter in a memory provided therewithin in order to return the current set position of the seat member to an originally set position on a basis of the stored data. In this case, a memory correction circuit is provided which corrects an erroneous stored data to an accurate value corresponding to the actual position in response to the presetting of the counter according to the number of times by which a manual switch which energizes the motor in a normal or reverse direction is operated. Therefore, the seat member can more accurately be returned to the originally set position.

5 Claims, 6 Drawing Figures

AUTOMATIC SEAT POSITIONING DEVICE FOR A VEHICLE DRIVER SEAT

BACKGROUND OF THE INVENTION

1. Field of the Invention

The present invention relates generally to an improved automatic seat positioning device for a driver's seat of a vehicle, and more specifically to a device for selecting a desired driving position of a driver's seat by rotating a reversible motor and engaging the motor with an electromagnetic clutch associated with each seat member, wherein a seat positional data obtained by counting the number of rotations of the motor is corrected to prepare for a correct return from the present seat position to an originally set seat position.

2. Description of the Prior Art

A motor-powered seat has been developed which can adjust a driver's seat to a desired position by means of a reversible motor with the driver sitting on the seat, wherein the adjusted seat position is once stored to return the adjusted seat position to an originally adjusted seat position automatically.

Such a conventional seat positioning device comprises: (a) a seat actuating mechanism comprising (1) a reversible motor, (2) a plurality of actuators each located within the seat member for actuating the associated seat member to move at a desired position in a normal or reverse direction within an adjustable range specified depending on the seat member, (3) a plurality of electromagnetic clutches each operatively engaged with the motor for transmitting a rotating force of the motor to the corresponding actuator at an output shaft of the motor so as to move the corresponding seat member toward the desired position, and (4) a motor drive circuit, having a plurality of manual reversible switches each provided for specifying an adjustable direction of the individual seat members, which energizes the motor to rotate in a normal or reverse direction with the motor engaged with one of the electromagnetic clutches depending on which of the manual switches is operated and which moving direction of the seat member through the associated manual reversible switch is specified; (b) a seat position control circuit connected to the reversible motor and motor drive circuit of said seat actuating mechanism which detects the positions of the individual seat members from the moved distances along the adjustable directions determined depending on the individual seat members by counting the number of rotations of the reversible motor, stores the counted seat positional data, and actuates the motor drive circuit to rotate the motor in the normal or reverse direction on a basis of the stored seat positional data when the seat position is changed to return to an originally set position.

It should be noted that the conventional seat positioning device is applied to such a driver's seat comprising the seat members, i.e., a seat freely supported on the vehicle body which can adjust a front-and-rear position thereof and an upward-and-downward position thereof with respect to the vehicle body, a seat back which can adjust a tilted angle thereof with respect to the vehicle body and can adjust a lumbar support position thereof, a seat cushion which can adjust an inclined angle thereof with respect to the seat, and a head restraint which can adjust an upward-and-downward position thereof.

The control circuit described above comprises: (a) a rotation number detector attached about the output rotating shaft of the reversible motor which generates and outputs pulses according to the number of rotations of the motor; (b) a plurality of reversible counters each provided for one of the adjustable directions of the seat members and connected to the rotation number detector for counting the number of pulses received from the rotation number detector incrementally or decrementally depending on the rotational direction of the motor; (c) a memory connected to the seat position data reversible counters for storing the counted values of the seat position data reversible counters into specified addresses thereof when a memory switch and one of the address switches provided for different drivers on an associated operation panel are operated; (d) a comparator connected to the memory and to the reversible counters via a data selector which operatively compares the stored seat positional data with the presently counted values of the individual reversible counters; and (e) a centralized control unit connected to the comparator which actuates the motor drive circuit to rotate the motor in the normal or reverse direction, with one of the electromagnetic clutches which is associated with the corresponding adjustable direction of one of the seat members connected to the motor, so that the corresponding seat member can be moved to an original seat position according to the stored counted positional data until the presently counted value of the corresponding reversible counter becomes equal to the stored counted value by the comparison of these values in the comparator when a return switch and the address switch allocated to the driver on the operation panel are operated.

However, in the conventional seat positioning device described above, since the rotating force of the reversible motor is transmitted via one of the electromagnetic clutches to the corresponding seat member actuator, a slip will occur between the electromagnetic clutch and output shaft of the motor whenever the motor starts or stops, engaged with each electromagnetic clutch. Once the slip occurs, there is a small deviation between the number of rotations of the reversible motor indicated by the corresponding reversible counter and actual displacement of the corresponding seat member along the adjustable direction. As repetitive start and stop of the reversible motor are carried out to adjust the entire seat position, an amount of deviations due to the recurrent slips is accumulated so that the respective reversible counters will not indicate actual set positions of the respective seat members. In this situation, if the reversible motor is driven by the control circuit via the motor drive circuit so as to make the contents of the individual reversible counters equal to the correspondingly stored values of the memory, the actually returned seat position does not coincide with the originally selected seat position by the original driver due to the accumulated deviations included in the contents of the corresponding reversible counter and consequential contents of the memory.

SUMMARY OF THE INVENTION

With the above-described problem in mind, it is an object of the present invention to provide an improved automatic seat positioning device, wherein each absolute position detection switch is installed at a position between a maximum adjustable limit and an initial position from which the corresponding seat member is moved in one direction only and turns on when the corresponding seat member is moved and arrives at the installed position and a preset means is additionally provided for clearing and presetting the counted value of the corresponding reversible counter when the absolute position detection switch is turned on to an absolute value of the rotational number of the motor which takes for the corresponding seat member to arrive at the installed position described above so that an accurate seat member positional data can subsequently be obtained and stored in the correspondingly specified address of the memory.

It is another object of the present invention to provide a further improved automatic seat positioning device, wherein a memory correction means and a plurality of unidirectional counters connected to the manual reversible switches are further provided therewithin, the individual unidirectional counters counting the individual number of times the associated manual reversible switches are activated, the counted value of each unidirectional counter being stored in the correspondingly specified address of the memory which is the same as the specified address of the corresponding seat member adjusting direction and allocated to the driver simultaneously when the memory switch and one of the address switches allocated to the driver are operated, i.e., the seat positional data of the reversible counters are written into the memory, the memory correction means responsive to the preset operation of the preset means described above calculating a first difference between the counted value of the corresponding reversible counter and preset value, calculating a second difference between the counted value of the corresponding unidirectional counter and number of times the corresponding manual reversible switch is operated which is stored in the specified address of the memory allocated to the driver, and correcting the stored counted value of the seat positional data in the same address of the memory on a basis of the first difference depending on the magnitude in the second difference, whereby the driver's seat can more accurately be changed to return to an originally set position by each driver.

BRIEF DESCRIPTION OF THE DRAWINGS

A more complete understanding of the present invention may be obtained from the following detailed description taken in conjunction with the attached drawings in which like reference numerals designate corresponding elements and in which.

DETAILED DESCRIPTION OF THE PREFERRED EMBODIMENTS

Reference will be made to the attached drawings to facilitate understanding of the present invention and first to FIG. 1(A) which shows motor-powered seat adjustable directions for a vehicle driver's seat.

Figure 1A:
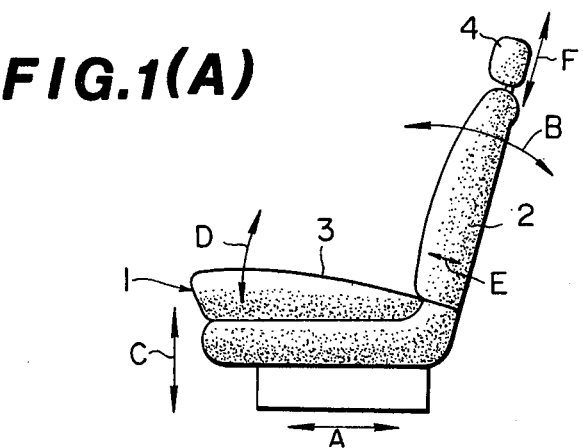
FIG. 1(A) is a side view of a motor-powered driver's seat.

In FIG. 1(A), numeral 1 denotes a seat used, e.g., as an automotive vehicle driver's seat, numeral 2 denotes a seat back, numeral 3 a seat cushion, and numeral 4 denotes a head restraint. A solid line denoted by A shows the front-and-rear adjustable direction of the seat 1. The solid line denoted by B shows the reclining adjustable direction of the seat back 2. The solid line denoted by C shows the height (up-and-down) adjustable direction of the seat 1. The solid line denoted by D shows the tilted angle adjustment of the seat cushion 3. The solid line denoted by E shows the lumbar support tilted angle adjustable direction of the seat back 2. The solid line denoted by F shows the up-and-down adjustment of the head restraint 4. The motor-powered driver's seat comprising the seat members described above can individually be moved to a desired position by means of a reversible motor, with a vehicle driver sitting on the seat.

Figure 1B:
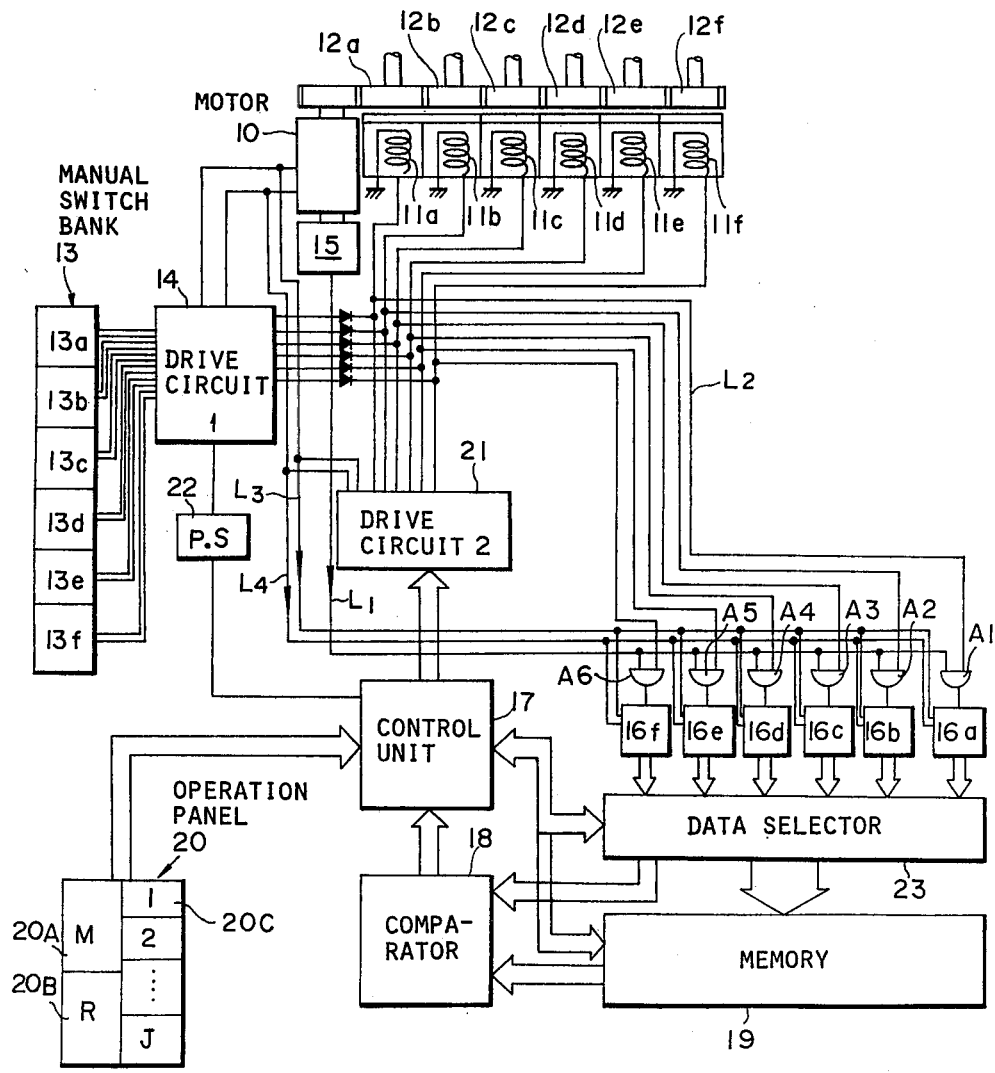
FIG. 1(B) is a block diagram of a conventional automatic seat positioning device applied to the motor-powered seat shown in FIG. 1(A)

FIG. 1(B) shows a conventional automatic seat positioning device applied to the motor-powered seat shown in FIG. 1(A).

In FIG. 1(B), the reversible motor 10 acts as a driving source. A plurality of electromagnetic clutches 11a through 11f transmit a turning force of the motor 10 to a plurality of seat member actuators 12a through 12f which move the respective seat members toward the adjustable directions A through F. Manual switch bank 13 comprises a plurality of manual reversible switches 13a through 13b each of which is provided for the corresponding adjustable direction A through F. A first drive circuit 14 connected between the manual switch bank 13 and reversible motor 10 is provided for driving the motor 10 to rotate in a normal or reverse direction depending on the switched position of each manual reversible switch 13 and associated one of electromagnetic clutches 11a through 11f. A rotation number detector 15 for detecting the number of rotations of the reversible motor 10 is provided which generates and outputs the number of pulses proportional to the rotational numbers of the reversible motor 10.

In addition to the above-described configuration, other circuits are described hereinafter for adjusting the seat position in accordance with the operation of the individual manual reversible switches 13a through 13f in the manual switch bank 13. A plurality of reversible counters 16a through 16f are provided for counting the detected pulse numbers from the rotation number detector 15 incrementally or decrementally depending on the rotational direction of the motor 10. A centralized control unit 17 outputs a control signal depending on the output contents from a comparator 18, an address signal, and read/write signal to the memory 19 according to an operation signal from an operation panel 20. A second drive circuit 21 connected to the centralized control unit 17 outputs a driving signal according to the signal from the control unit 17 to the motor 10 and one of the electromagnetic clutches 11a through 11f. A priority selector 22 sets a priority order at a time when the manual switch bank 13 and one of the different switches on the operation panel 20 are operated simultaneously.

In addition, a plurality of address switches 20c each of which indicates an allocation number J (J=1, 2, ... , J) for identifying a driver to take the seat. The address information of the memory 19 is determined depending on the specification of one of the allocation numbers. When, e.g., the manual reversible switch 13a of the manual switch bank 13 provided for adjusting the seat in the front-and-rear direction A is operated, a drive signal is applied from the first drive circuit 14 to the reversible motor 10 to actuate the motor 10 to rotate in the normal or reverse direction depending on either of which positions the manual reversible switch 13a is depressed, e.g., rear direction side or front direction side. The drive signal is simultaneously fed into the corresponding electromagnetic clutch 11a via a diode. The output rotating shaft of the motor 10 is thereby engaged with the corresponding actuator 12a to transmit the motor turning force thereto. A sole seat member actuating mechanism comprising the clutch 11a and actuator 12a in this case makes a front-and-rear adjustment of the seat 1. For other manual reversible switches 13b, 13c, 13d, 13e and 13f with the same mechanism as the manual reversible switch 13a, when the switches are operated in this order, the operation of the motor 10 and corresponding electromagnetic clutch among 11b through 11f enables corresponding seat member position adjustment sequentially so that the seat can entirely be positioned.

On the other hand, when the switch 13a of the manual switch bank 13 is operated, the rotation number detector 15 detects the amount of rotations of the reversible motor 10 and outputs pulses, the number of which corresponds to the number of rotations of the reversible motor 10. The signal for energizing the electromagnetic clutch 11a is branched via a line $L_2$ to enable a corresponding AND gate circuit $A_1$.

Therefore, the output pulse of the rotation number detector 15 passed through a line $L_1$ is counted by the corresponding reversible counter 16a via the line $L_1$ and the driving signal of the reversible motor 10 is applied via lines $L_3$ and $L_4$ so that the counter 16a also performs addition or subtraction (increment or decrement) depending on the polarity across the lines $L_3$ and $L_4$, i.e., the direction in which the reversible motor rotates.

For each of the other switches 13b through 13f, according to the rotation number of the reversible motor 10 the adjustment position B through F of each of the other seat members is counted by the corresponding reversible counter 16b through 16f.

Thus, upon completion of manual operation to adjust the entire seat position via the respective manual reversible switches 13a through 13f, the positional data of each reversible counter 16a through 16f is written into the memory 19. In other words, when a memory switch 20A on the operation panel 20 is turned on and one of the address switches 20C allocated to an individual driver, e.g., J=1 is turned on, the control unit 17 outputs a write signal to the memory 19 and a data selector 23 so that the positional data of the reversible counter 13a is stored in a first address $A_{11}$ of a memory location allocated to the driver who has turned on the address switch 20C (,i.e., J=1), that of the other reversible counter 13b stored in a second address $A_{12}$, the counter 13c in a third address $A_{13}$, the counter 13d in a fourth address $A_{14}$, the counter 13e in a fifth address $A_{15}$, the counter 13f in a sixth address $A_{16}$, sequentially in the specified address.

The seat position data stored in the memory 19 is thereby used for changing the entire motor-powered seat position to return to an original position in accordance with the positional data stored in the memory 19.

In the case when the driver wants to return the driver's seat from the presently set position to the originally set position, the driver may turn on merely the return switch 20B and one of the address switches 20C allocated to the driver on the operation panel 20.

When both switches 20B and 20C are turned on, the control unit 17 sends a read signal with address number data specified for the driver to the memory 19. Thereafter, the control unit 17 reads the stored seat positional data from the specified addresses sequentially, e.g., first through sixth addresses $A_{11}$ through $A_{16}$ and feeds the contents of the addresses into the comparator 18 where the read data are compared sequentially with corresponding positional data now that the reversible counters 16a through 16f have counted.

The comparator 18 sends compared results to the control unit 17 if the difference exists between these compared data.

The control unit 17 sends a control signal according to the difference obtained from the comparator 18 to the second drive circuit 21.

The second drive circuit 21 drives the motor 10 to rotate in the normal or reverse direction and, at the same time, e.g., the corresponding electromagnetic clutch 11a to engage with the motor 10 so that the corresponding actuator 12a is engaged with the motor 10 and moved to actuate the seat 1 toward an originally adjusted position, i.e., the position stored in the first address $A_{11}$ if the counted positional data obtained by the reversible counter 16a is different from the originally adjusted position data, i.e., the contents of the first address $A_{11}$. If there is no difference in the compared result between the contents of one address and the seat positional data from the corresponding counter 16a through 16f, the control unit 17 does not, of course, send the control signal to the second drive circuit 21.

Figure 2:
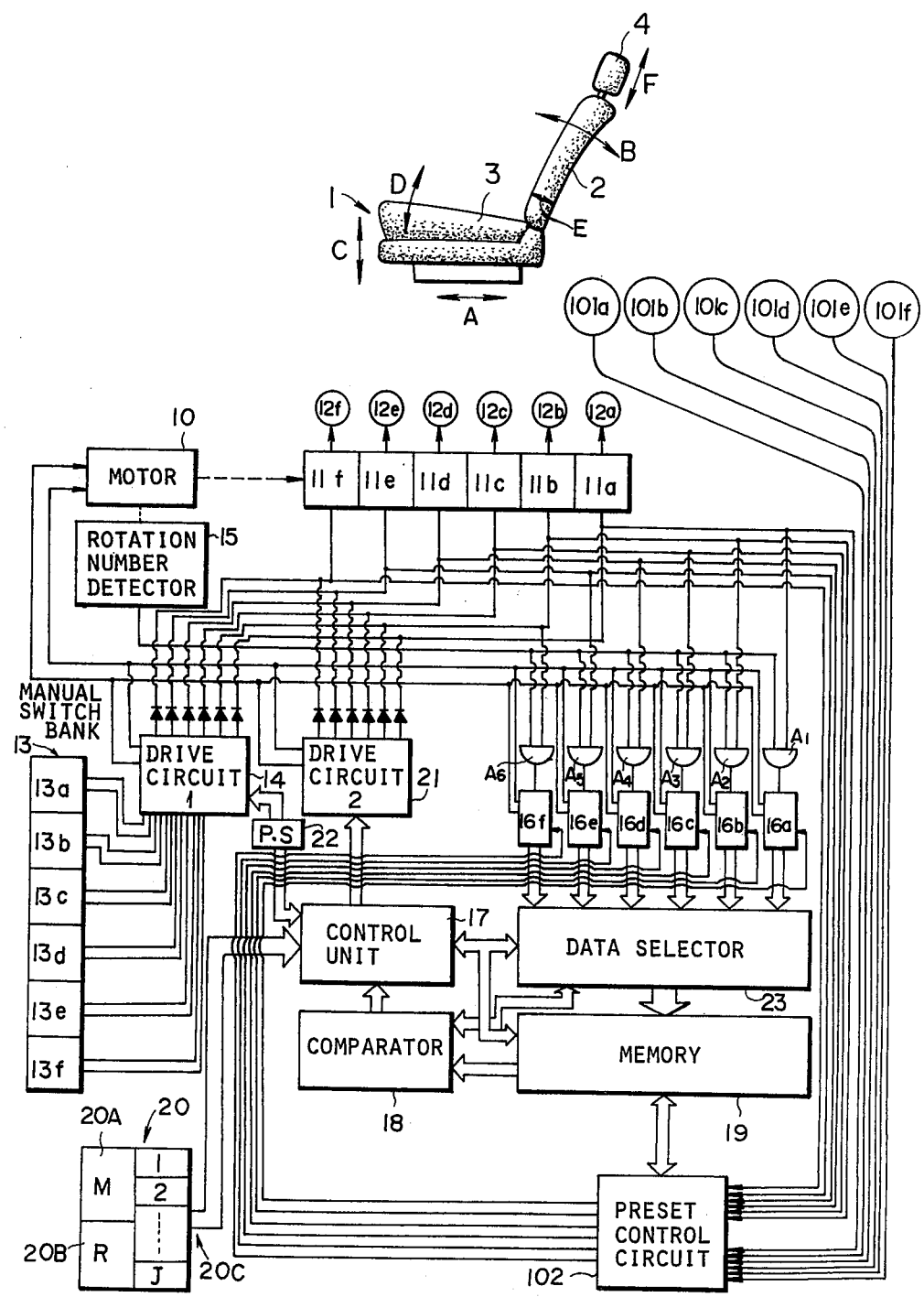
FIG. 2 is a block diagram of an automatic seat positioning device showing a first preferred embodiment according to the present invention applicable to the motor-powered seat shown in FIG. 1(A)

FIG. 2 shows a first preferred embodiment of the automatic powered seat positioning device according to the present invention.

In FIG. 2, numerals 101a through 101f denote absolute position detector switches each installed at a specific location of the corresponding seat member between a maximum adjustable limit and initial position from which the corresponding seat member can be moved only in one direction. In this embodiment, a first absolute position detection switch 101a is installed at a maximum limit position of the seat 1 shown in FIG. 1(A) and FIG. 2, i.e., a leftmost position along the adjustable direction A as viewed from FIG. 2 at which the seat 1 can advanced at maximum, a second absolute position detection switch 101b is installed at a maximum limit position of the seat back 2, i.e., a maximum tilted angle along the adjustable direction B, a third absolute position detection switch 101c is installed at a maximum height position of the seat 1 along the adjustable direction C, a fourth absolute position detection switch 101d is installed at a maximum inclined position of the seat cushion 3 with respect to the seat 1 along the adjustable direction D, a fifth absolute position detection switch 101e is installed at a maximum protruded position of the lumbar support portion of the seat back 2 along the adjustable direction E, and a sixth absolute position detection switch 101f is installed at a maximum height position of the head restraint 4 along the adjustable direction F. These switches 101a through 101f turn on when the respective seat members arrive at the installed positions. In addition, numeral 102 denotes a preset control circuit which operatively changes the contents of each reversible counter 16a through 16f to a corresponding preset value Na through Nd. Each preset value Na through Nd which corresponds to a predetermined number of rotations of the reversible motor 10. The predetermined number of rotations of the reversible motor 10 described above is that of the reversible motor 10 required for the reversible motor 10 to move the associated seat member to the installed position of the absolute position detection when 101a through 101f from the initial position along the corresponding adjustable direction A through F.

When one of the manual reversible switches 13a through 13f is turned on so as to drive the motor 10 to rotate in the normal or reverse direction via the first drive circuit 14 with the corresponding electromagnetic clutch 11a through 11f energized to engage with the motor 10. The rotational force of the motor 10 is thereby transmitted into the corresponding actuator 12a through 12f so that the associated seat member is moved to a desired position along the corresponding adjustable direction A through F.

In this way, the driver can adjust each seat member to the desired position through the manual switch bank 13.

At this time, the number of rotations of the motor 10 which has taken for each seat member to arrive at the corresponding set position is detected by means of the rotation number detector 34 and counted individually by means of each corresponding reversible counter 16a through 16f according to the order in which manual reversible switches 13a through 13f are operated alternatingly.

After such a seat adjustment as described above is made, the positional data in the form of the number of rotations of the motor 10 counted by each corresponding reversible counter 16a through 16f is stored in each corresponding address of a memory area allocated to each driver when the memory switch 20A and corresponding address switch (J=1 through J) 20C are activated. At this time, the control unit 17 operates the counted data of each reversible counter 16a through 16f to be written into each corresponding specified address of the memory 19. After such a storage operation as described above is ended, the driver can drive the vehicle in this position and another driver can adjust the seat to his desired position through the manual switch bank 13. At this time, he must operate the memory switch 20A and another address switch except for the previous driver(s) (J=1 through J) 20C on the operation panel 20 after setting the seat to his desired position. Next, when a driver who has previously set the seat to his desired position takes the driver's seat and activates the return switch 20B and one of the address switches 20C allocated to him in order to return the entire seat to his originally set position from the currently set position, the stored data in the addresses of the memory area allocated to the driver are moved into the comparator 18 from the memory 19 by means of the control unit 17 and the counted positional data indicated by the reversible counters 16a through 16f are also moved into the comparator 18 via the data selector 23. The comparator 18 compares the positional data stored in each address of the memory 19 with each corresponding positional data counted in the corresponding counter 16a through 16f. If the compared data values do not agree with each other, the control unit 17 outputs a control signal to the second drive circuit 21 to drive the motor 10. The second drive circuit 21 then sends a motor drive signal to the motor 10 and simultaneously energizes the corresponding clutch 11a through 11f to engage with the motor 10 until the counted value of the corresponding reversible counter 16a through 16f becomes equal to the stored data value. When they are made equal to each other, the motor 10 is stopped and disengaged from the clutch 11a through 11f so that the entire seat can automatically be returned to his originally set position along each adjustable direction A through F.

For example, if the seat 1 is moved to the leftmost position or the seat 1 is brought in contact with the first absolute position switch 101a, the first absolute position switch 101a is activated. The preset control circuit 102 responsive to the activation of the first absolute position switch 101a clears the contents of the corresponding reversible counter 16a, and presets the reversible counter 16a so as to indicate the preset value Na. For the preset value Na, a description has been made hereinbefore.

Therefore, a deviation of the counted value of the corresponding reversible counter 16a from the actual position of the seat 1 along the front-and-rear direction A due to slips between the output shaft of the motor and corresponding electromagnetic clutches 11a generated by repetitive start and stop of the motor 10 can completely be eliminated. The reversible counter 16a starts counting of the number of pulses received from the rotation number detector 15 with the preset value Na as an initial value. In this way, each reversible counter 16a through 16f is preset to each preset value Na through Nf when each seat member is moved along the corresponding adjustable direction A through F and brought in contact with each corresponding absolute position detection switch 101a through 101f.

Consequently, the counted value of each reversible counter 16a through 16f is changed to a correct positional data without error. Therefore, the stored positional data after such a correction operation described above is carried out becomes accurate and thereby the entire seat can accurately be returned to the original set position.

Figure 3:
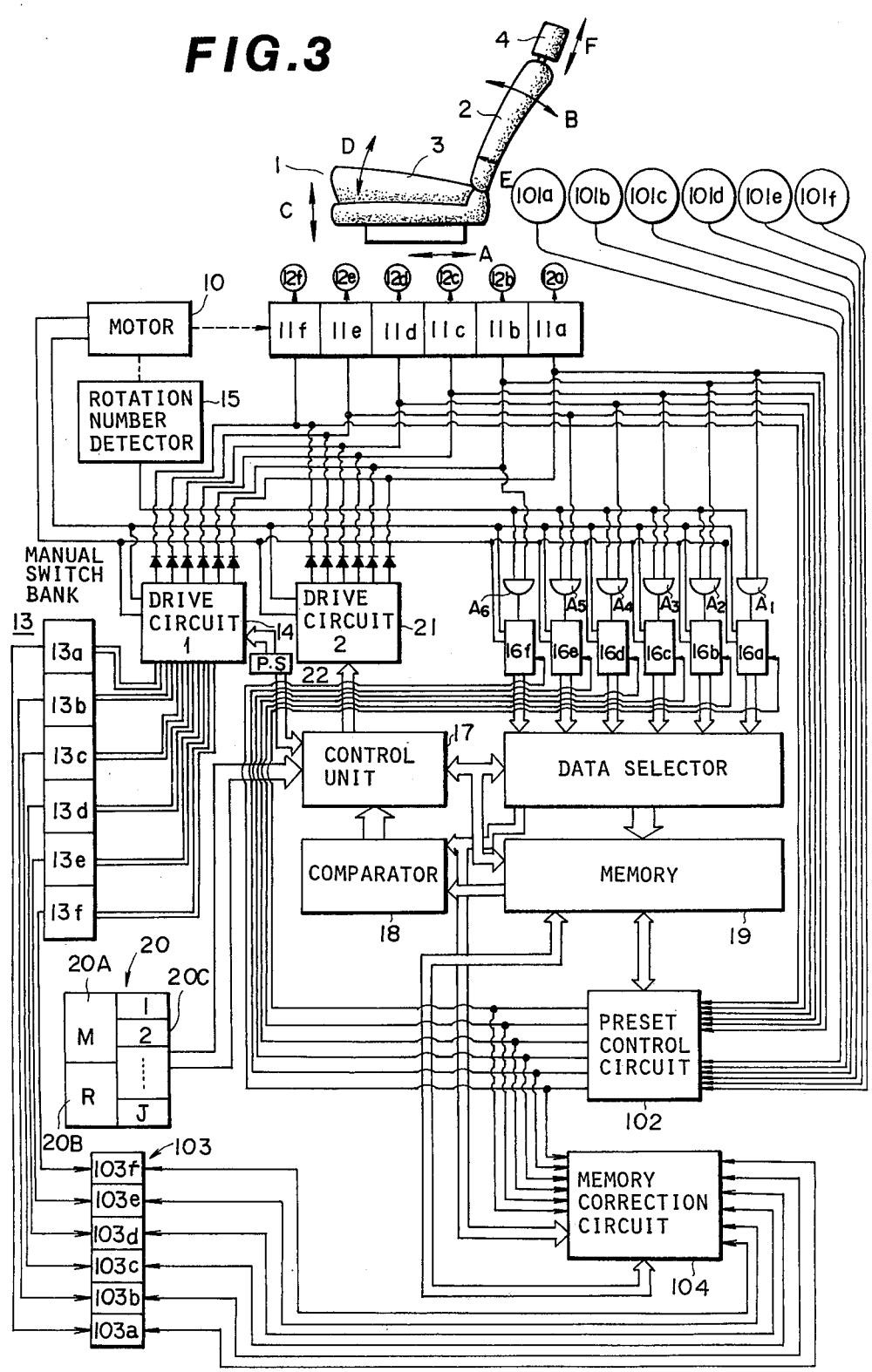
FIG. 3 is a block diagram of an automatic seat positioning device showing a second preferred embodiment according to the present invention applicable to the motor-powered seat shown in FIG. 1(A)

FIG. 3 shows a second preferred embodiment of the automatic seat positioning device according to the present invention.

In this embodiment, the seat positional data values on one of the six adjustable directions A through F stored in the memory addresses allocated to the drivers are also corrected at the same time when the corresponding reversible counter 16a through 16f is preset in response to the activation of the corresponding absolute position detection switch 101a through 101d.

In FIG. 3, numeral 103 denotes another counter group each counter 103a through 103f of which counts one whenever the corresponding manual switch 13a through 13f is activated in the normal or reverse direction by the driver to rotate the motor 10 in the designated direction with the corresponding clutch 11a through 11f engaged therewith. In addition, as shown in FIG. 3, a memory correction circuit 104 is incorporated to correct the seat positional data values on one of the adjustable directions A through F stored in the specified memory addresses at the same time as the preset operation described in the first preferred embodiment.

It should be noted that the contents of each counter 103a through 103f, i.e., the number of times by which the corresponding manual reversible switch 13a through 13f is activated is cleared and stored in the same address of the memory area allocated to the driver as the positional data counted by the corresponding reversible counter 16a through 16f when the memory switch 20A and the address switch allocated to the driver 20C are activated.

A correction operation on the memory 19 is described hereinafter with reference to FIG. 3 and also to FIG. 4 and FIG. 5.

Figure 4:
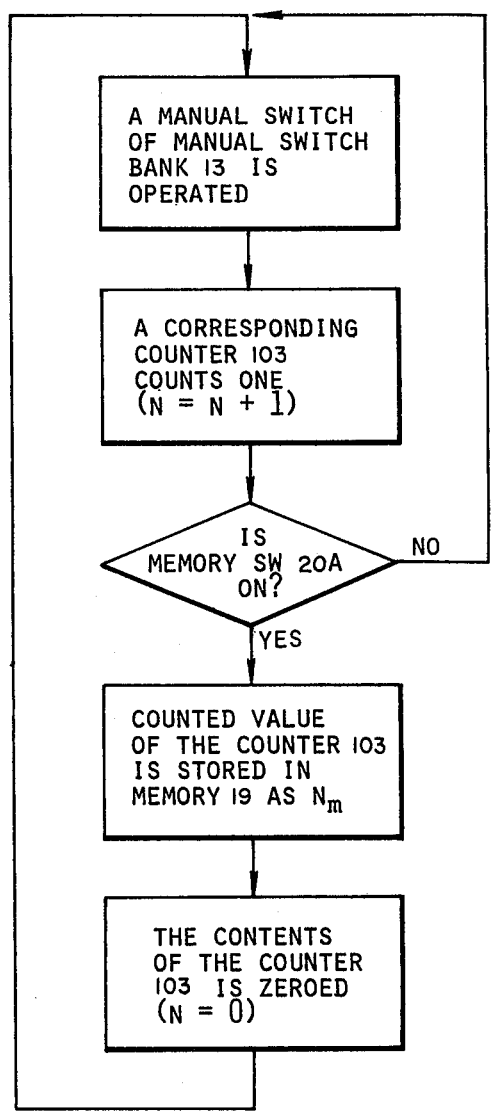
FIG. 4 is an operational flowchart for explaining part of the sequence of the memory correction operation in the second preferred embodiment shown in FIG. 3.

As shown in the operational flowchart of FIG. 4, each counter 103a through 103f of the counter group 103 counts one whenever the corresponding manual reversible switch 13a through 13f is activated (N=N+1). Such counting operation of the counter group 103 continues until the memory switch 20A and address switch allocated to the driver 20C are activated. When both switches 20A and 20C are activated, the number of times Nm by which each of the manual reversible switches 13 has been activated and which has been counted by the corresponding 103a through 103f is stored in an individual address of the memory 19 specified according to the corresponding adjustment direction A through F within the memory area allocated to the driver. After such storage operation, the contents of the counter group 103 is cleared. Thereafter, the automatic return control is possible for returning to the originally adjusted seat position through the return switch 20B and driver's address switch 20C on the operation panel 20.

Figure 5:
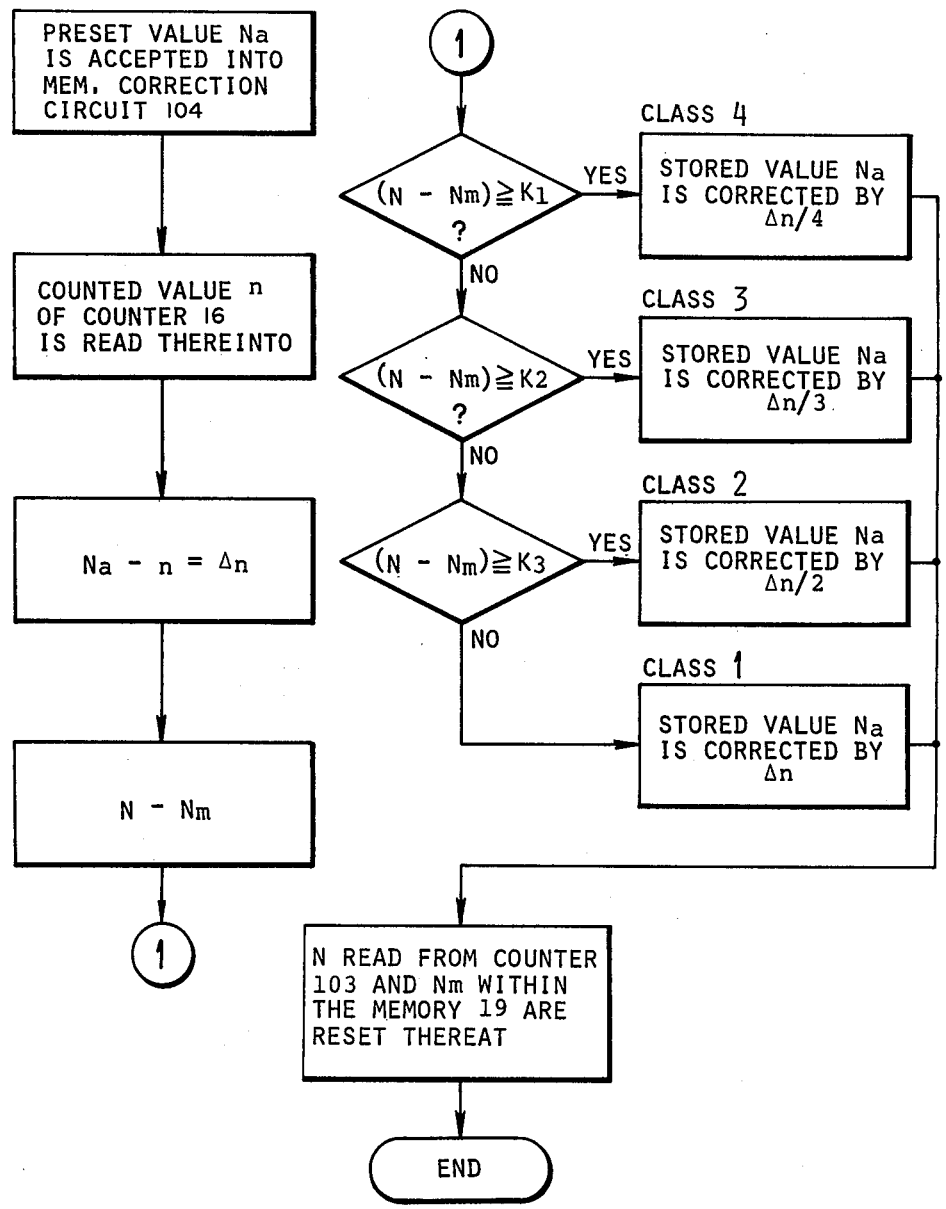
FIG. 5 is an operational flowchart for explaining part of the sequence of the memory correction operation in the second preferred embodiment shown in FIG. 3.

FIG. 5 shows an operational flowchart for correcting the current seat positional data stored in the memory 19 on the front-and-rear adjustable direction A as a typical example by means of the memory correction circuit 104 shown in FIG. 3.

When the corresponding manual reversible switch 13a of the manual switch bank 13 is activated to move the seat 1 to the maximum front position along the front-and-rear direction A via the motor 10, the corresponding absolute position detection switch 101a is activated so that the preset control circuit 102 operates in such a way as described before. The preset control circuit 102 sends the preset value Na corresponding to the maximum front position of the seat 1 to the memory correction circuit 104 as well as to the corresponding reversible counter 16a. At this time, the memory correction circuit 104 also reads the current seat position counted value n from the corresponding reversible counter 16a before presetting is made.

Subsequently, the memory correction circuit 104 calculates a first difference ($\Delta n = Na - n$) between the preset value Na and counted value n of the corresponding reversible counter 16a. The memory correction circuit 104, furthermore, reads the number of times Nm by which the manual reversible switch 13a has been activated and which has been counted by the corresponding counter 103a from the memory 19. The number of times Nm by which the corresponding manual reversible switch 13a has been activated counted by the corresponding counter 103a to be read by the memory correction circuit 104 includes all data stored in the addresses, i.e., ($A_{11}$), ($A_{21}$), - - -, ($A_{J1}$) specified for the front-and-rear adjustable direction A allocated to the assigned drivers. If there is no contents in any address, the memory correction circuit 104 does not need to read from the address(es). At this time, the memory correction circuit 104 reads the present contents of the unidirectional counter 103a, i.e., the current number of times N the corresponding manual switch has been activated for adjusting the seat position in the direction A and determines whether a second difference result of N−Nm falls within either of four classes divided by three reference values $K_1$, $K_2$, and $K_3$ ($K_1 > K_2 > K_3$). The reason for this is that as the second difference between the stored number of times Nm and the present number of times N becomes large, the time at which the positional value of the seat 1 is stored in the specified address of the memory 19 becomes closer to the present time. Therefore, as the difference becomes smaller, the time at which the positional value of the seat 1 is stored becomes far away from the present time, i.e., the time at which the preset control circuit 102 is operated. It will be appreciated that as the elapsed time described above becomes newer the number of times the slip occurs in the corresponding electromagnetic clutch 11a becomes fewer. If the second difference (N−Nm) is large, the correction amount for the stored positional data in the memory 19 may be small. If the second difference (N−Nm) is small, the correction amount needs to be large. The memory correction operation is described hereinafter on a basis of the difference between the number of times N the corresponding manual reversible switch has been operated (counted by the counter 103) and that Nm stored within the memory 19.

As shown by a first decision block in FIG. 5, when the second difference (N−Nm) is equal to or more than the largest reference value $K_1$, the memory correction circuit 104 determines that the stored positional data value in the same address of the memory 19 is newest and corrects the seat position value stored in the memory 19 on a basis of $\Delta n/4$. When the second difference (N−Nm) exists intermediate between the reference values $K_1$ and $K_2$, the seat position value stored in the memory 19 is corrected on a basis of 66 n/3. When the second difference (N−Nm) exists intermediate between the reference values $K_2$ and $K_3$, the seat position data value stored in the memory 19 is corrected on a basis of $\Delta n/2$. Furthermore, when the second difference (N−Nm) is less than the least reference value $K_3$, the seat position data value Na stored in the memory 19 is corrected directly on a basis of $\Delta n$.

Upon completion of such a correction operation in the stored seat positional data value in the memory 19 on a basis of each correction amount described above according to the magnitude of second difference (N−Nm), the memory correction circuit 104 resets the stored number of times Nm in the memory 19 used for the correction operation and the present number of times N read from the corresponding counter 103a thereinto. The present positional data n read from the corresponding reversible counter 16a and the preset value Na from the preset control circuit 102 are also reset thereat.

Alternatively, another correction processing may be carried out in which the correction amount for the memory 19 is increased as the counted value of the corresponding counter 103a through 103f is increased.

It should be noted that although in these preferred embodiments described hereinabove the absolute seat position detection switches 101a through 101f are located at the maximum limit positions of the respective adjustable directions A through F for activating the preset control circuit 102, preset control or memory correction control may be performed by setting the positions of the respective seat position detection switches 101a through 101f nearly at the central positions in the respective adjustable directions A through F, i.e., the positions at which the respective absolute seat position detection switches 101a through 101f are not specifically limited.

As described hereinbefore, the automatic seat positioning device for a vehicle according to the present invention further comprises a seat position detecting means, i.e., absolute seat position detection switches which detect that the seat is moved to a predetermined seat position so that a counted value of seat position indicating means, i.e., each reversible counter which counts the number of rotations of a reversible motor according to the rotational direction thereof is cleared and is preset to a correct positional value when the seat position detecting means detects that the seat is moved to the predetermined seat position.

Therefore, a deviative error between the seat positional value by the counter on a basis of the number of rotations of the motor and actual seat positional value can be canceled so that the seat positional value in the counter after such canceling operation can always indicate the actual movement position of the seat.

As in the case of the second preferred embodiment shown in FIG. 3, each seat positional value stored in the memory 19 is corrected on a basis of a correction amount classified according to the difference in the number of times the corresponding manual reversible switch 13a through 13f has presently been activated and the memory 19 stores therein at the time of storage operation. As an alternative, the correction amount for the memory 19 may be classified on a basis of the magnitude of the counted number of times by which each manual switch 13a through 13f has been activated.

In other words, since the counted value of each counter 103a through 103f indicates the number of times by which the motor 10 is started and stopped, the number of times by which the slip occurs in each of the electromagnetic clutches 11a through 11f is increased as the counted value of the corresponding counter 103a through 103f increases. Consequently, the deviation of the seat positional data value in the corresponding counter 16a through 16f from the actual position is increased accordingly. Therefore, the correction amount is increased according to the number of times indicated by the corresponding counter 103a through 103f.

Since the automatic seat positioning device according to the present invention also corrects the originally selected seat positional data values at the time when the respective counters for counting the number of rotations of the reversible counter incrementally and decrementally so as to indicate the position of respective seat members are corrected by the preset control circuit, the stored values are corrected to more accurate originally selected seat positional data so that the seat can more accurately be returned to an originally set position of the individual driver on a basis of the corrected seat positional data in the memory.

It will be clearly understood by those skilled in the art that modifications may be made in the preferred embodiments described hereinbefore without departing the spirit and scope of the present invention, which is to be defined by the appended claims.

What is claimed is:

1. An automatic seat positioning device for a vehicle driver's seat, comprising:
    (a) a seat actuating mechanism including a reversible motor, a plurality of actuators each located within an associated seat member of said seat for actuating said associated seat member of said seat to move to a desired position in a normal or reverse direction within an adjustable range specified depending on the associated seat member, a plurality of electromagnetic clutches each operatively engaged with the motor for transmitting a rotating force of the motor to move the associated seat member toward the desired position, and a motor drive circuit, having a plurality of manual reversible switches each provided for the adjustable direction of the individual seat members, which engages one of said electromagnetic clutches with said motor depending on which of said manual reversible switches is activated to specify the adjustable direction of the associated seat member;
    (b) a seat position control circuit connected to the reversible motor and motor drive circuit of said seat actuating mechanism having a plurality of reversible counters each counting the number of rotations of said reversible motor for detecting the position of the associated seat member along the corresponding adjustable direction, storage means operatively storing the counted value of each reversible counter and actuating means operatively actuating said motor drive circuit to rotate in the normal or reverse direction on a basis of the stored seat positional data when the seat position is changed to return to an original set position;
    (c) a preset control means which operatively clears and presets each of the counted values of said reversible counters of said seat position control circuit to a preset value so that the corresponding reversible counter indicates an actual position of the associated seat member; and
    (d) a plurality of absolute position detection means each installed at a position between a maximum adjustable limit and initial position from which the corresponding seat member is moved in one adjustable direction which notifies said preset control means when the associated seat member arrives at the installed position so that said preset control means clears and presets the corresponding reversible counter to the preset value.

2. The automatic seat positioning device of claim 1, wherein said preset value of said preset control means is a number of rotations of said reversible motor required for the associated seat member to arrive at the installed position along the corresponding adjustable direction thereof.

3. The automatic seat positioning device of claim 1, which further comprises:
    (a) a plurality of unidirectional counters each connected to said corresponding manual reversible switch and each of which counts the number of times the corresponding manual switch has been activated in the normal or reverse direction; and
    (b) a memory correction means which corrects the stored counted value from each reversible counter in said storage means according to the counted value of said unidirectional counter which corresponds to the adjustable direction of the associated seat member in response to the preset of said reversible counter by means of said preset control means.

4. The automatic seat positioning device of claim 3, wherein the counted value of each of said unidirectional counters is stored into the same address of said storage means as the counted value of said corresponding reversible counter for each of the adjustable directions of the seat members and wherein said memory correction means calculates a first difference between the current counted value of said corresponding unidirectional counter and the stored counted value, calculates a second difference between the current counted value of said corresponding reversible counter and preset value of said preset control means, and corrects the stored counted value according to the magnitude of said first difference result on a basis of said second difference result.

5. The automatic seat positioning device of claim 4, wherein said memory correction means corrects the stored counted value of said corresponding reversible counter so that a correction amount according to said second difference result becomes decreased stepwise as said first difference result becomes larger by dividing the magnitude of said first difference result into four classes.

* * * * *